(12) United States Patent
Rhee et al.

(10) Patent No.: US 9,165,211 B2
(45) Date of Patent: Oct. 20, 2015

(54) IMAGE PROCESSING APPARATUS AND METHOD

(75) Inventors: Seon Min Rhee, Seoul (KR); Yong Beom Lee, Seoul (KR); Sang Wook Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 506 days.

(21) Appl. No.: 13/251,782

(22) Filed: Oct. 3, 2011

(65) Prior Publication Data

US 2012/0099782 A1    Apr. 26, 2012

(30) Foreign Application Priority Data

Oct. 20, 2010    (KR) .................. 10-2010-0102441

(51) Int. Cl.
*G06K 9/00* (2006.01)
*G06K 9/46* (2006.01)

(52) U.S. Cl.
CPC .......... *G06K 9/4671* (2013.01); *G06K 9/00201* (2013.01)

(58) Field of Classification Search
None
See application file for complete search history.

(56) References Cited

U.S. PATENT DOCUMENTS

| 6,664,956 B1* | 12/2003 | Erdem .................. 345/419 |
| 7,103,211 B1* | 9/2006 | Medioni et al. .............. 382/154 |
| 7,492,927 B2* | 2/2009 | Marschner et al. .......... 382/118 |
| 7,512,255 B2* | 3/2009 | Kakadiaris et al. .......... 382/118 |
| 8,224,064 B1* | 7/2012 | Hassebrook et al. ......... 382/154 |
| 2006/0269143 A1* | 11/2006 | Kozakaya .................... 382/218 |
| 2009/0304299 A1* | 12/2009 | Motomura et al. .......... 382/254 |

FOREIGN PATENT DOCUMENTS

| KR | 10-2005-0066400 | 6/2005 |
| KR | 10-2006-0081300 | 7/2006 |
| KR | 10-2008-0097089 | 11/2008 |
| KR | 10-2009-0050567 | 5/2009 |
| KR | 10-2009-0091639 | 8/2009 |
| KR | 10-2010-0000671 | 1/2010 |

* cited by examiner

*Primary Examiner* — Vikkram Bali
(74) *Attorney, Agent, or Firm* — NSIP Law

(57) ABSTRACT

Provided is an image processing apparatus for extracting a three-dimensional (3D) feature point from a depth image. An input processing unit may receive a depth image and may receive, via a user interface, selection information of at least one region that is selected as a target region in the depth image. A geometry information analyzer of the image processing apparatus may analyze geometry information of the target region within the input depth image, and a feature point extractor may extract at least one feature point from the target region based on the geometry information of the target region.

19 Claims, 7 Drawing Sheets

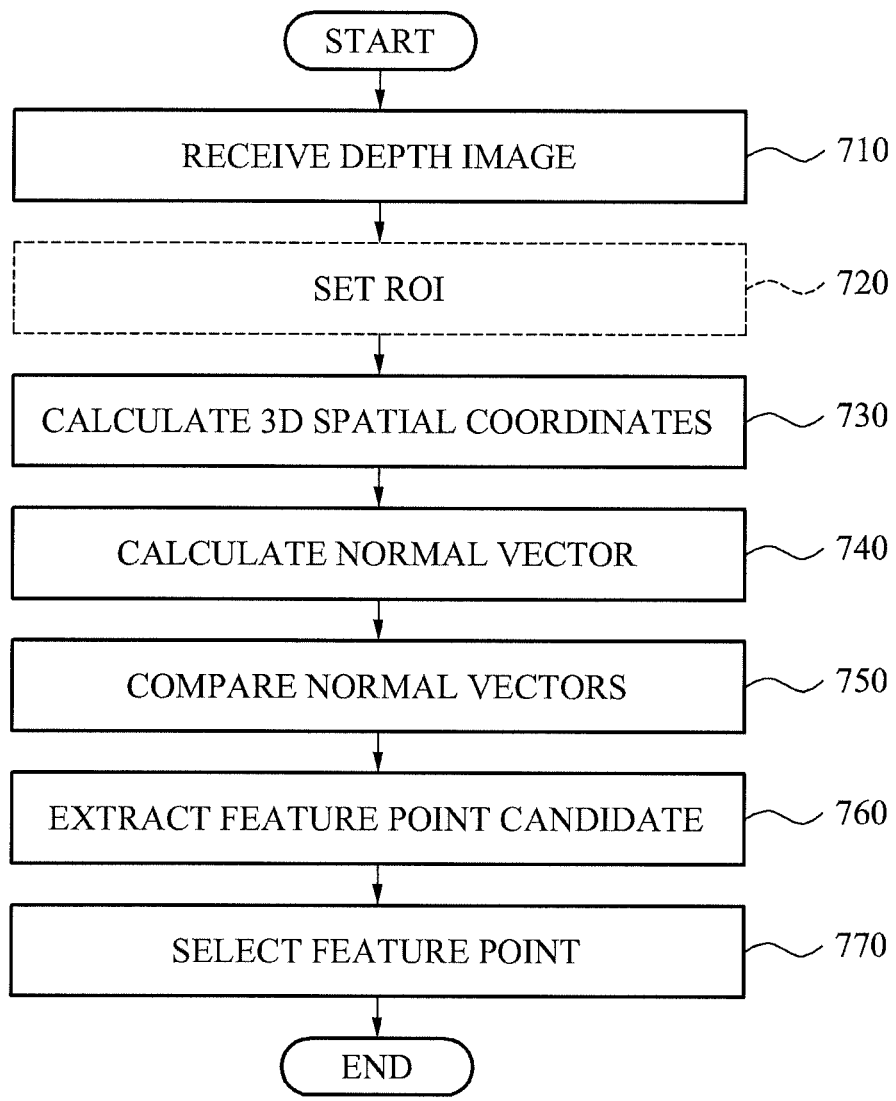

IMAGE PROCESSING APPARATUS AND METHOD

CROSS-REFERENCE TO RELATED APPLICATIONS

This application claims the priority benefit of Korean Patent Application No. 10-2010-0102441, filed on Oct. 20, 2010, in the Korean Intellectual Property Office, the disclosure of which is incorporated herein by reference.

BACKGROUND

1. Field

Example embodiments relate to an image processing apparatus and method that may extract a feature point from an input image, and more particularly, to an image processing apparatus and method that may extract a three-dimensional (3D) feature point by analyzing surface information of a target object using a depth image.

2. Description of the Related Art

A technology of extracting and tracking a feature point in an image may be employed for a variety of fields, for example, image search, camera pose estimation, robot vision, and the like.

In a conventional art, the above feature point extracting and tracking technology has been performed using an image (hereinafter, a brightness image) that is generated by a sensor of sensing an intensity of light corresponding to a predetermined wavelength band and converting the sensed intensity of light to an electrical charge.

Depending on an illumination condition of a surrounding environment acquiring the brightness image, the brightness image may vary over time with respect to the same regional point and thus, a repeatability of feature point extraction may be low.

The repeatability corresponds to a performance measurement function with respect to a feature component extraction and thus, indicates a rate of a feature component repeatedly extracted at the same position.

When the above repeatability is not maintained, it may be difficult to match feature components between two images with different viewpoints, or to track or match feature points between video frames.

SUMMARY

The foregoing and/or other aspects are achieved by providing an image processing apparatus, including: a geometry information analyzer to analyze geometry information of a target region within an input depth image; and a feature point extractor to extract at least one feature point from the target region based on the geometry information of the target region.

The image processing apparatus may further include an input processing unit to receive the input depth image and selection information of at least one region within the input depth image, and to determine the at least one region as the target region within the input depth image.

The selection information of the at least one region within the input depth image may be received from a user via a user interface.

The geometry information analyzer may include: a coordinate calculator to calculate a three-dimensional (3D) spatial coordinate value of each of pixels included in the target region; and a normal vector calculator to calculate a surface normal vector of each of the pixels based on the 3D spatial coordinate value of each of the pixels.

The feature point extractor may include: a normal vector comparator to compare a surface normal vector of a first pixel among the pixels included in the target region with normal vectors of neighboring pixels of the first pixel; a feature point candidate extractor to extract the first pixel as a feature point candidate when a sum of angle differences between the surface normal vector of the first pixel and the normal vectors of the neighboring pixels of the first pixels is greater than or equal to a first threshold; and a feature point selector to select a feature point of the depth image from pixels extracted as the feature point candidates, including the first pixel.

When the first pixel is determined as an object edge, the feature point selector may exclude the first pixel from the feature point candidate.

The image processing apparatus may further include a feature point matching unit to match at least one feature point with at least one feature point extracted from the target region corresponding to a previous frame when the at least one feature point is extracted from the target region corresponding to a current frame of the depth image. The depth image may include a plurality of frames.

The foregoing and/or other aspects are achieved by providing an image processing apparatus, including: analyzing geometry information of a target region within an input depth image; and extracting at least one feature point from the target region based on the geometry information of the target region.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 7 illustrates an image processing method according to example embodiments.

DETAILED DESCRIPTION

Figure 1:
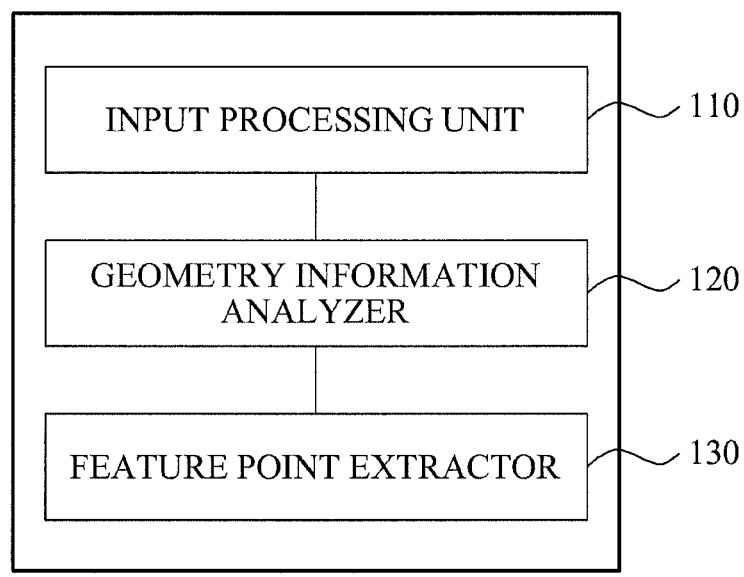
FIG. 1 illustrates an image processing apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an image processing apparatus 100 according to example embodiments.

According to example embodiments, the image processing apparatus 100 may increase a repeatability by extracting a feature point using a depth image.

Also, according to example embodiments, the image processing apparatus 100 may readily perform matching between depth image frames with varying camera viewpoints, or may readily perform feature point tracking between video frames.

When the depth image is input, an input processing unit 110 may determine, from the depth image, a target region or a region of interest (ROI) that is a target of a feature point extraction.

The target region may be determined by selecting at least one portion within the depth image using a user interface. For example, when a user selects a portion of the input depth image using the user interface such as a mouse, the image processing unit 110 may determine the selected portion as the target region.

According to example embodiments, a predetermined region including an object of interest within a database may be automatically designated as the target region using brightness image matching.

The depth image may be acquired in real time using a depth camera of a time of flight (TOF) scheme using infrared (IR) and the like.

The depth image may be an image synthesized using a stereo camera.

The target region may correspond to one portion selected from the depth image, and the entire depth image may be determined as the target region.

When the depth image is input and the target region that is a target for feature point extraction is determined from the depth image, the geometry information analyzer 120 may analyze geometry information of each pixel within the target region.

The analysis of the geometry information may correspond to a process of calculating a three-dimensional (3D) spatial coordinate value of each pixel within the target region, and calculating a surface normal vector corresponding to each pixel using the calculated 3D spatial coordinates.

A configuration and an operation of the geometry information analyzer 120 will be further described with reference to FIG. 2 and FIG. 3.

When geometry information of the target region is analyzed, the feature point extractor 130 may extract feature point candidates from pixels included in the target region, and may select at least one portion of the feature point candidates as feature points of the depth image.

According to example embodiments, the feature point candidates may correspond to pixels having a sum of angle differences of surface normal vectors with neighboring pixels greater than or equal to a first threshold.

The feature point extractor 130 may exclude, from the feature point candidates, a pixel corresponding to an edge portion that is a boundary between different planes.

The feature point extractor 130 may determine a 3D feature point of the depth image by selecting, from the extracted feature point candidates, a predetermined number of pixels in a descending order of the sum of angle differences.

A configuration and an operation of the feature point extractor 130 will be further described with reference to FIG. 3 and FIG. 4.

Instead of extracting a feature point from a brightness image, or in addition to extracting of the feature point from the brightness image, a 3D feature point may be extracted using a depth image.

Accordingly, even though a surrounding illumination environment varies or even though a camera viewpoint varies depending on a frame, a feature point having a high repeatability may be extracted and be tracked.

Figure 2:
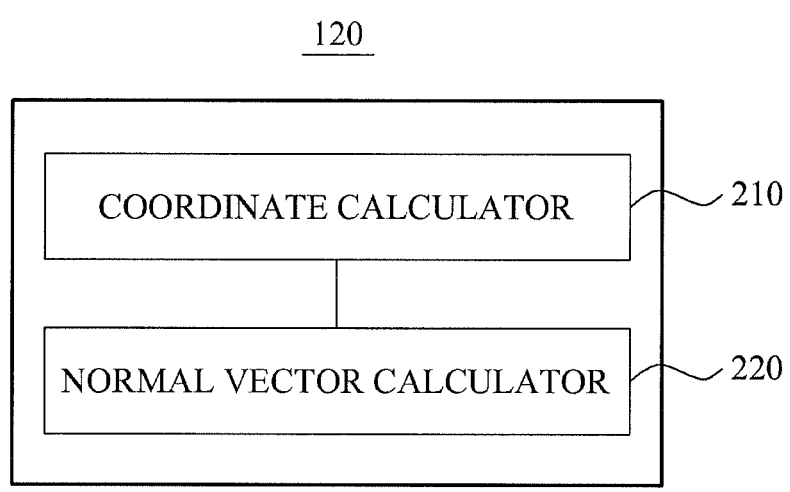
FIG. 2 illustrates a configuration of a geometry information analyzer of the image processing apparatus of FIG. 1.

FIG. 2 illustrates a configuration of a geometry information analyzer 120 of the image processing apparatus 100 of FIG. 1.

Figure 4:
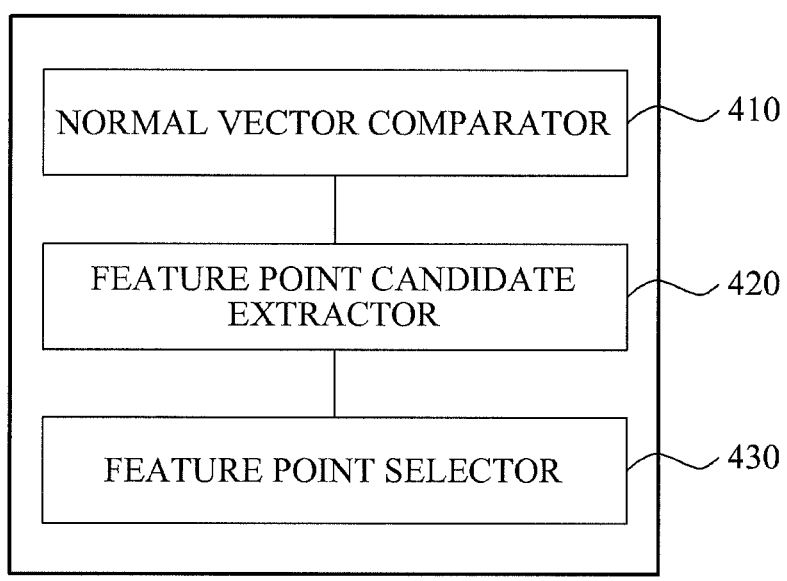
FIG. 4 illustrates a configuration of a feature point extractor of the image processing apparatus of FIG. 1.

Referring to FIG. 4, the geometry information analyzer 120 may include a coordinate calculator 210 and a normal vector calculator 220. The coordinate calculator 210 may calculate a 3D spatial coordinate value of each of pixels included in a target region. The normal vector calculator 220 may calculate a surface normal vector of each of the pixels based on the 3D spatial coordinate value of each of the pixels.

The coordinate calculator 210 may calculate spatial coordinate values by obtaining a position and a direction, and the like, within a 3D space with respect to each of the pixels within the target region of the input depth image determined by the image processing unit 110.

The normal vector calculator 220 may calculate the surface normal vector by obtaining an outer product between two vectors that use a predetermined pixel as a start point and head for a neighboring pixel.

When a surface normal vector is calculated with respect to each of the pixels within the target region, the calculation result may be visualized by a normal map with respect to the target region of the depth image.

Figure 3:
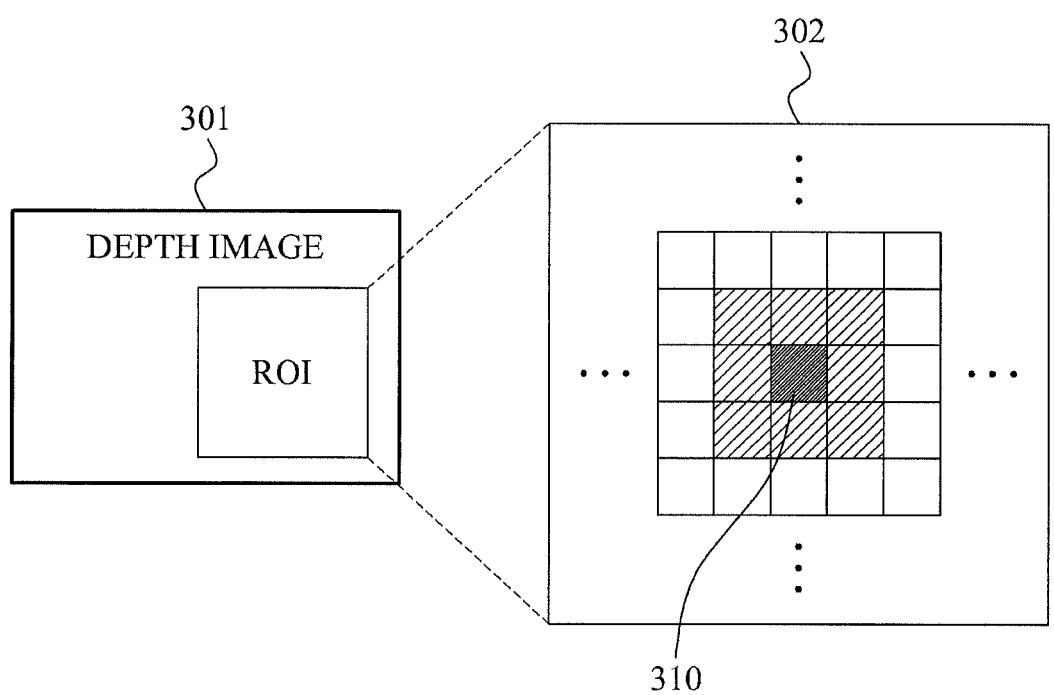
FIG. 3 illustrates a process of analyzing geometry information of a depth image and extracting a feature point using an image processing method according to example embodiments.

FIG. 3 illustrates a process of analyzing geometry information of a depth image 301 and extracting a feature point using an image processing method according to example embodiments.

When a target region or an ROI 302 within the depth image 301 is determined, the geometry calculator 210 of the geometry information analyzer 120 may calculate 3D spatial coordinates of each of pixels included in the target region 302, for example, a pixel 310.

The normal vector calculator 220 may calculate a surface normal vector of each of the pixels.

The feature point extractor 130 may compare the surface normal vector of the pixel 310 with a surface normal vector of each of pixels adjacent to the pixel 310, for example, eight pixels surrounding the pixel 310.

The above comparison may correspond to a process of adding up angle differences between the surface normal vector of the pixel 310 and surface normal vectors of the neighboring pixels.

FIG. 4 illustrates a configuration of the feature point extractor 130 of the image processing apparatus 100 of FIG. 1.

Referring to FIG. 4, the feature point extractor 130 may include a normal vector comparator 410 to calculate a total sum of angle differences by comparing the surface normal vector of the pixel 310 with normal vectors of the neighboring pixels.

When the total sum of angle difference is greater than or equal to a first threshold, the feature point extractor 130 may include a feature point candidate extractor 420 to extract the pixel 310 as a feature point candidate.

A feature point selector 430 may select, as final feature points of the depth image from among the feature point candidates including the pixel 310, a predetermined number of pixels having a relatively great sum of angle differences.

Even though the total sum of angle differences is greater than or equal to the first threshold, the feature point extractor 130 may exclude, from the feature point candidates, pixels corresponding to an edge of an object. An edge portion may have a normal vector angle being significantly different from the neighboring pixels, however, may not correspond to a feature point for image matching or camera pose tracking.

When a predetermined pixel and a corresponding neighboring pixel belong to different planes, the feature point extractor 130 may exclude the predetermined pixel from the feature point candidates.

Similar to the above normal vector example, the total sum of angle differences may be visualized by a feature point candidate map.

The feature point selector 430 may determine, as final feature points of the depth image, a predetermined number of pixels having a relatively great total sum of angle differences among the feature point candidates.

The feature point selector 430 may determine a predetermined block window size within the target region 302, and may select, as a final 3D feature point of the depth image, a pixel having a greatest total sum of angle differences within a single window size.

Even though the example embodiments are described, various modifications and changes may be made without departing from the spirit.

Figure 5:
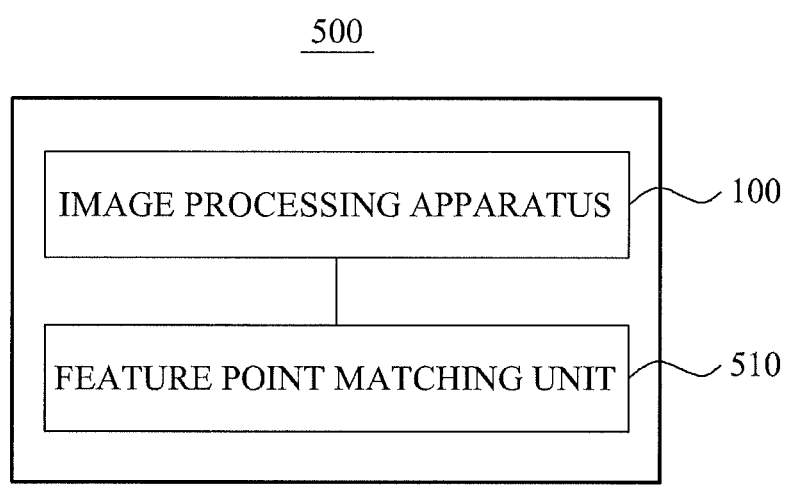
FIG. 5 illustrates an image processing apparatus according to other example embodiments.

FIG. 5 illustrates an image processing apparatus 500 according to other example embodiments.

A process of the image processing apparatus 100 extracting a 3D feature point from a single frame of a depth image is described above with reference to FIG. 1 through FIG. 4.

In the case of the depth image including a plurality of frames, the above process may be iteratively and recursively performed for each frame.

A feature point matching unit 510 may compare a feature point extracted from a previous frame with a feature point extracted from a current frame, and may match the extracted feature points.

Matching may be used to track a feature point according to a frame change. The feature point tracking may be employed in a variety of fields, for example, an image processing field, a robot vision and the like.

The above matching may be performed by an iterative closest point (ICP) scheme and the like.

Figure 6:
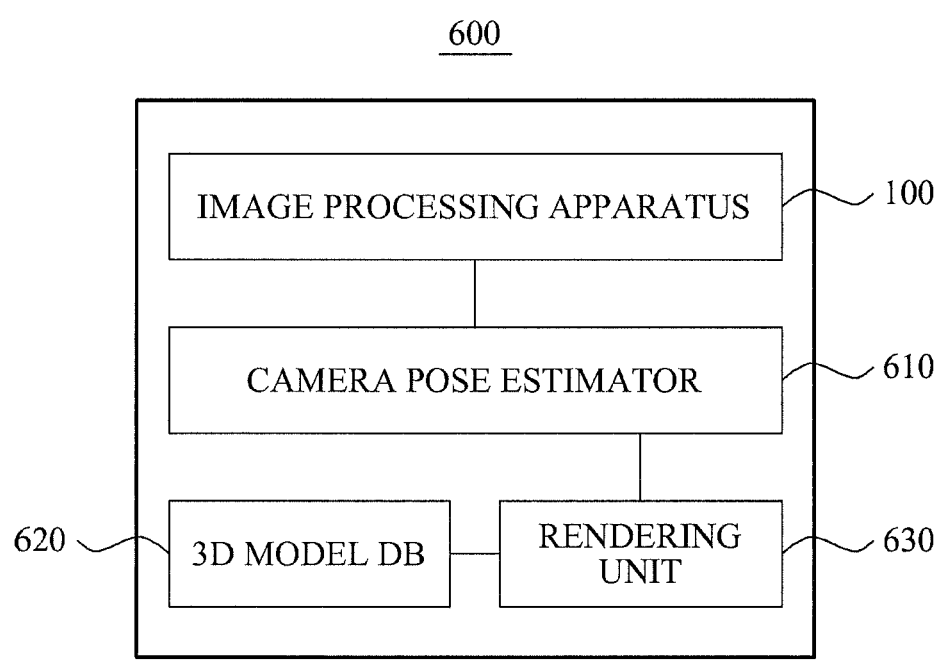
FIG. 6 illustrates an image processing apparatus according to still example embodiments.

FIG. 6 illustrates an image processing apparatus 600 according to still other example embodiments.

When the image processing apparatus 100 extracts a 3D feature point from a single frame of a depth image, a camera pose estimator 610 may compare the 3D feature point with a feature point extracted from a previous frame and then perform matching of the extracted 3D feature point. When 3D feature point matching is performed, the camera pose estimator 610 may estimate a camera pose based on a relationship therebetween.

The camera pose estimation may be performed for a camera calibration. Depending on embodiments, the camera pose estimation may be used when a rendering unit 630 renders a 3D image using a 3D model database 620.

FIG. 7 illustrates an image processing method according to example embodiments.

In operation 710, the input processing unit 110 of the image processing apparatus 100 may receive a depth image. In operation 720, the image processing unit 110 may selectively set an Region of Interest (ROI) or a target region.

In operation 730, the coordinate calculator 210 may calculate 3D spatial coordinates with respect to each of pixels included in the ROI.

In operation 740, the normal vector calculator 220 may calculate a surface normal vector of each of the pixels.

The above process is described above with reference to FIG. 1 and FIG. 2.

In operation 750, the normal vector comparator 410 of FIG. 4 may compare surface normal vectors of the pixels.

In operation 760, the feature point candidate extractor 420 may detect, as feature point candidates, pixels having a sum of angle differences of surface normal vectors with neighboring pixels greater than a first threshold.

In operation 770, the feature point selector 430 may select at least one portion of the feature point candidates as final feature points of the input depth image. The process of extracting and selecting feature point candidates is described above with reference to FIG. 3 and FIG. 4.

The image processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A three-dimensional (3D) image processing apparatus, comprising:
    an image processor, comprising:
        a geometry information analyzer to analyze geometry information of a target region of an image within an input depth image of the 3D image; and
        a feature point extractor to select at least one feature point from the target region based on the geometry information of the target region,
    wherein the geometry information comprises a surface normal vector of a pixel included in the target region, and
    wherein the feature point extractor selects the at least one feature point based on an angle difference between the surface normal vector and a surface normal vector of a neighboring pixel of the pixel.

2. The image processing apparatus of claim 1, further comprising:
    an input processing unit to receive the input depth image and selection information of at least one region within the input depth image, and to determine the at least one region as the target region within the input depth image.

3. The image processing apparatus of claim 2, wherein the selection information of the at least one region within the input depth image is received from a user via a user interface.

4. The image processing apparatus of claim 1, wherein the geometry information analyzer comprises:
    a coordinate calculator to calculate a three-dimensional (3D) spatial coordinate value of the pixels included in the target region; and a normal vector calculator to calculate the surface normal vector of each of the pixels based on the 3D spatial coordinate value of each of the pixels.

5. The image processing apparatus of claim 4, wherein the normal vector calculator calculates the surface normal vector of the first pixel by obtaining an outer product between two vectors that use the first pixel as a start point and head for a neighboring pixel.

6. The image processing apparatus of claim 4, wherein the feature point extractor comprises:
   a normal vector comparator to compare a surface normal vector of a first pixel among the pixels included in the target region with surface normal vectors of neighboring pixels of the first pixel;
   a feature point candidate extractor to select the first pixel as a feature point candidate when a sum of angle differences between the surface normal vector of the first pixel and the surface normal vectors of the neighboring pixels of the first pixels is greater than or equal to a first threshold; and
   a feature point selector to select a feature point of the depth image from pixels selected from a plurality of feature point candidates, which include the feature point candidate corresponding with the selected first pixel.

7. The image processing apparatus of claim 6, wherein when the first pixel is determined to correspond with an object edge, the feature point selector excludes the first pixel from the feature point candidate.

8. The image processing apparatus of claim 6,
   wherein if the first pixel is determined to correspond with an object edge of the image, the feature point candidate extractor excludes the first pixel from being selected as the feature point candidate if the sum of angle differences between the surface normal vector of the first pixel and the surface normal vectors of the neighboring pixels of the first pixel is less than the first threshold.

9. The image processing apparatus of claim 1, further comprising:
   a feature point matching unit to match at least one feature point with at least one feature point extracted from the target region corresponding to a previous frame when the at least one feature point is extracted from the target region corresponding to a current frame of the depth image,
   wherein the depth image comprises a plurality of frames.

10. A three-dimensional (3D) image processing method, comprising:
    analyzing geometry information of a target region of an image within an input depth image of the 3D image;
    selecting, using an image processor, at least one feature point from the target region based on the geometry information of the target region,
    wherein the geometry information comprises a surface normal vector of a pixel included in the target region, and
    wherein the feature point extractor selects the at least one feature point based on an angle difference between the surface normal vector and a surface normal vector of a neighboring pixel of the pixel.

11. The image processing method of claim 10, further comprises:
    prior to the analyzing of the geometry information, receiving the input depth image and selection information of at least one region within the input depth image; and
    determining the at least one region as the target region within the input depth image.

12. The image processing method of claim 9, wherein the selection information of the at least one region within the input depth image is received from a user via a user interface.

13. The image processing method of claim 10, wherein the analyzing comprises:
    calculating a three-dimensional (3D) spatial coordinate value of each of pixels included in the target region; and
    calculating the surface normal vector of each of the pixels based on the 3D spatial coordinate value of each of the pixels.

14. The image processing method of claim 13, wherein the selecting of the at least one feature comprises:
    comparing a surface normal vector of a first pixel among the pixels included in the target region with surface normal vectors of neighboring pixels of the first pixel;
    extracting the first pixel as a feature point candidate when a sum of angle differences between the surface normal vector of the first pixel and the surface normal vectors of the neighboring pixels of the first pixels is greater than or equal to a first threshold; and
    selecting a feature point of the depth image from pixels extracted as a plurality of feature point candidates, which include the feature point candidate corresponding with the selected first pixel.

15. The image processing method of claim 14, wherein if the first pixel is determined to correspond with an object edge of the image, the first pixel is excluded from being selected as the feature point candidate if the sum of angle differences between the surface normal vector of the first pixel and the surface normal vectors of the neighboring pixels of the first pixel is less than the first threshold.

16. The method of claim 15,
    wherein the matching is performed by an interactive closest point (ICP) method a 3D model databases to store rendering until to render a 3D image using the 3D model database.

17. The image processing method of claim 10, further comprising:
    matching at least one feature point with at least one feature point extracted from the target region corresponding to a previous frame when the at least one feature point is extracted from the target region corresponding to a current frame of the depth image,
    wherein the depth image comprises a plurality of frames.

18. A non-transitory computer-readable medium comprising a program for instructing a computer to perform the method of claim 10.

19. A three-dimensional (3D) image processing apparatus, comprising:
    an image processor selects a 3D feature point from a single frame of a depth image based on a geometry information which is obtained by analyzing a target region of an image within the depth image and the feature point based on an angle difference between the surface normal vector and a surface normal vector of a neighboring pixel of the pixel; and
    a camera pose estimator to compare the 3D feature point with a frame feature point extracted from a previous frame, to perform matching of the extracted 3D feature point to estimate a camera pose.

* * * * *